July 4, 1967  H. F. EDGAR  3,329,461
HEADLIGHT DEFLECTOR
Filed May 3, 1965  3 Sheets-Sheet 1
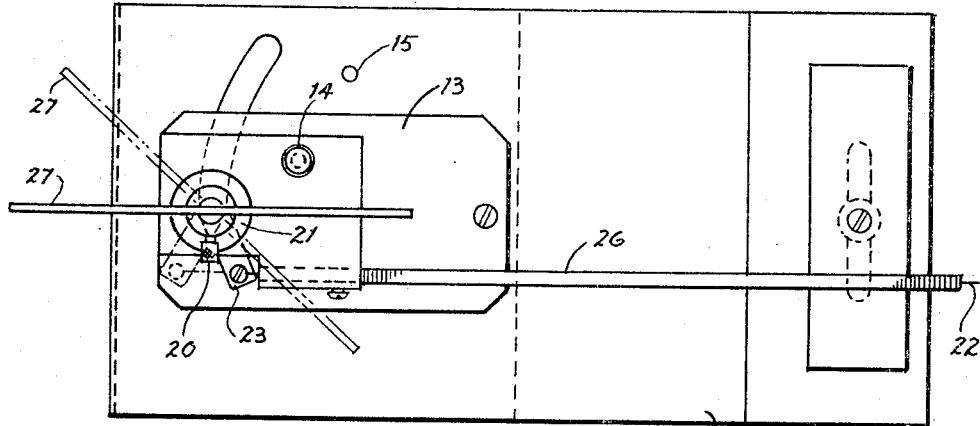
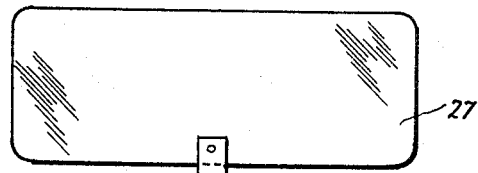
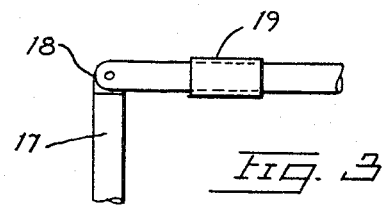
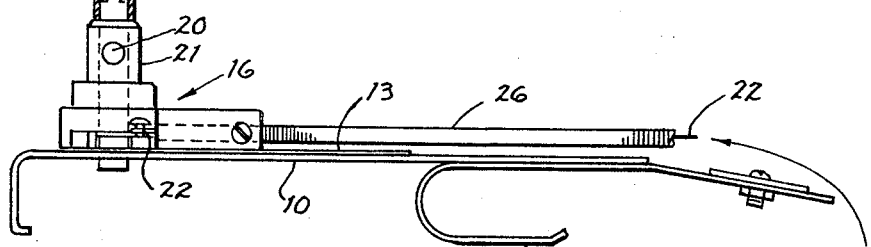
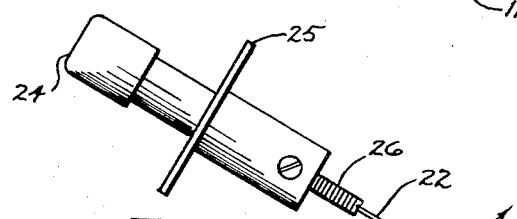
INVENTOR
HERBERT FRANK EDGAR July 4, 1967  H. F. EDGAR  3,329,461
HEADLIGHT DEFLECTOR
Filed May 3, 1965  3 Sheets-Sheet 2

INVENTOR
HERBERT FRANK EDGAR

July 4, 1967  H. F. EDGAR  3,329,461
HEADLIGHT DEFLECTOR
Filed May 3, 1965  3 Sheets-Sheet 3
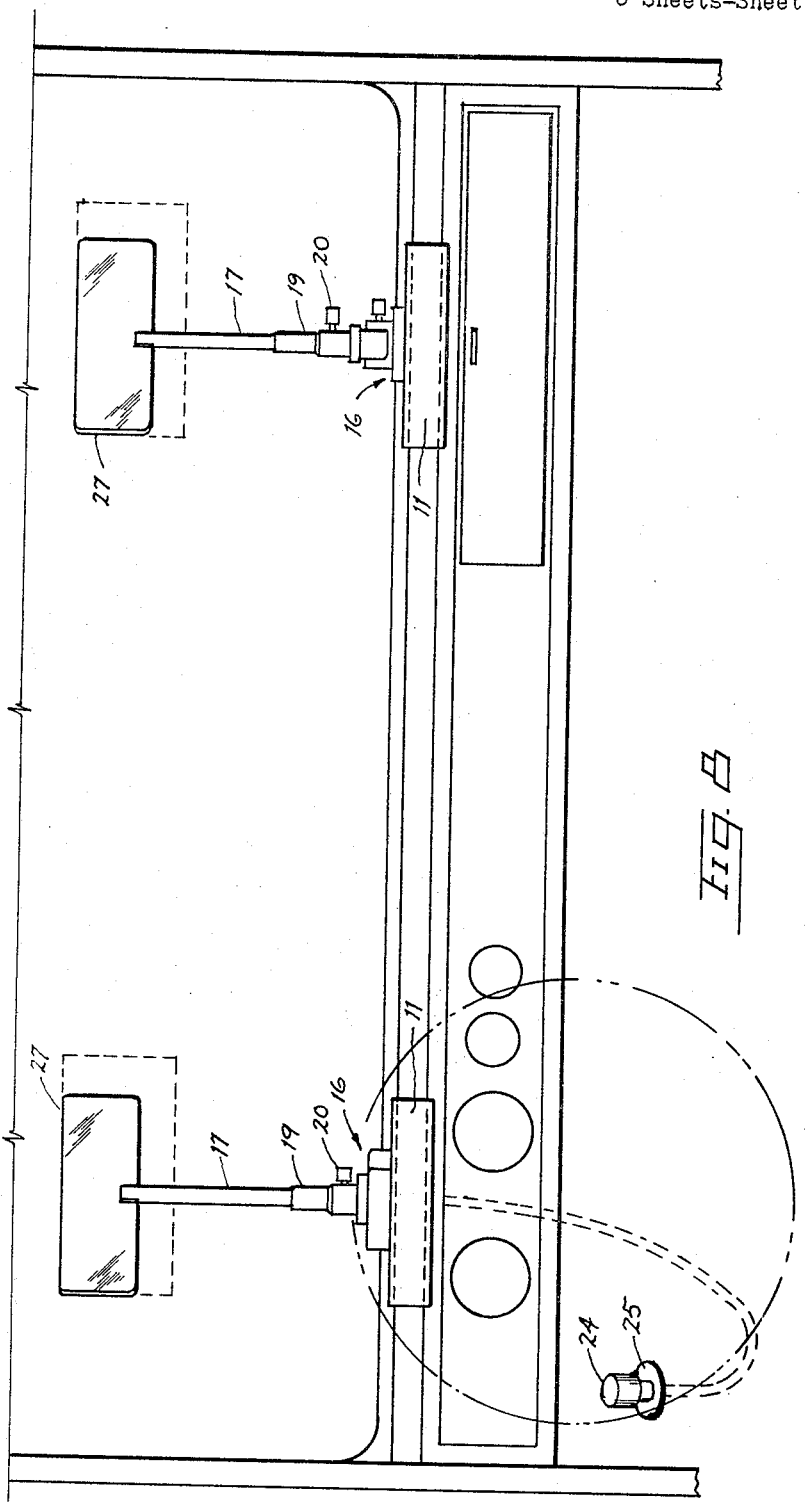
INVENTOR
HERBERT FRANK EDGAR

United States Patent Office 3,329,461
Patented July 4, 1967

3,329,461
HEADLIGHT DEFLECTOR
Herbert Frank Edgar, 505 Sherbrooke St.,
Peterborough, Ontario, Canada
Filed May 3, 1965, Ser. No. 452,506
1 Claim. (Cl. 296—97)

This invention relates to new and useful improvements in devices for deflecting glare from headlights of oncoming automobiles in order to considerably reduce the risk of accidents, which is often caused by automobile drivers being blinded by oncoming headlights, and completely losing sight of the roadway.

Broadly, the invention comprises a device to be mounted on the dash of an automobile intended to be used for night driving only, and folded out of the way during the daytime. The device is set in front of the operator of a vehicle in his line of vision in such a manner that when it is not in use it does not interfere with his vision, and it can be rotated in operating position by means of a plunger normally mounted on the floor of the vehicle next to the dimmer switch. Another such device adapted to be used by a passenger is readily adjusted to any position, and is manually operated. For normal operation the device is rotated approximately 30 degrees, to create the desired effect.

For efficient operation the device is set on the driver's side one-third the distance on this side of the highway from the center line and sighted at approximately one sixth of a mile, or three city blocks, from the right edge of the device when turned at a 30 degree angle. The device comprises a base attached to the dash pad of an automobile, an upright post formed with a folding joint and a rectangular sheet of blue plastic, a flexible shaft is connected to the post, which is rotatable in its base, and terminates on the floor of the vehicle. A foot actuated plunger is affixed to that extremity of said shaft for operating the device. A retaining sleeve prevents the post from folding down when the device is in use. During the daytime the sleeve is lifted on the post and the said post is folded down out of the sight of vision of the operator.

When driving on a four lane highway, the device is provided with an adjustment which permits it to rotate the rectangular plastic shield at a greater angle to cover the additional width of the roadway.

As it is apparent from the accompanying drawing, the device can be adjusted up or down to suit the operator of a vehicle and the sheet of transparent material can be tilted angularly. During the daytime, when the device is not required, it can be folded down to lie on top of the dashboard.

The main object of the invention is therefore the provision of a device to eliminate headlight glare from oncoming traffic during night driving.

Another important object is the provision of a device which when rotated at an angle of approximately 30 degrees provides a prism effect and enlarges substantially the glare eliminating area.

Still another object is to provide a foot operated plunger to rotate the device when required so that the operator of a vehicle is not required to remove a hand from the steering wheel.

Still another object of the invention is the provision of a hinged joint in the upright member of the device to fold same out of the way during the daytime.

Other apparent objects are the provision of a useful and dependable device as set forth which is efficient, easy to operate, and of comparatively low manufacturing cost.

With these and other objects in view that may appear as the description proceeds, the invention consists in the novel arrangement of co-operating elements as hereinafter more specifically set forth, claimed and shown in the accompanying drawing forming part of this application, and in which:

FIGURE 1 is a top plan view of the deflector constructed in accordance with the present invention:

FIGURE 2 is a side elevational view thereof showing in broken line the foot operated plunger;

FIGURE 3 is a detailed view of the hinged joint to fold the device out of the way during daytime;

FIGURE 4 is the foot operated plunger mounted on the floor of the vehicle to operate the device;

FIGURE 8 shows the interior view of a vehicle with my invention mounted thereon.

Figure 5:
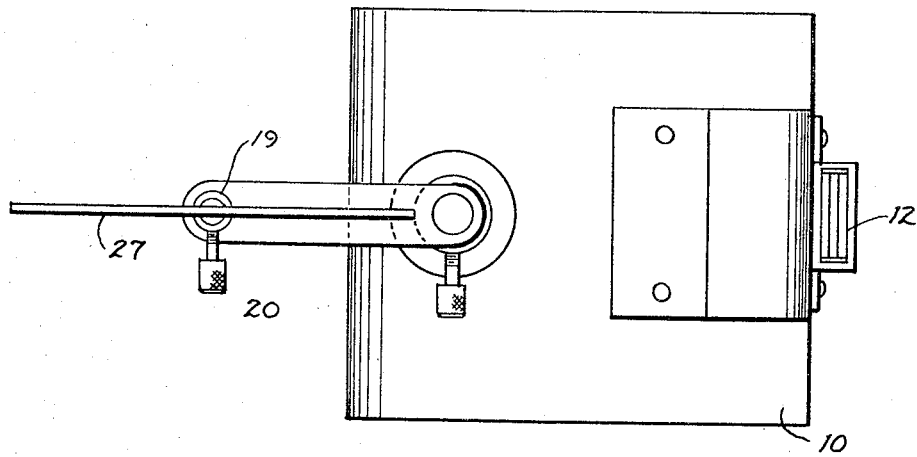
FIGURE 5 is a plan view of a modified version of the device adapted to be used on the passenger side of the vehicle and is manually operated.
Figure 6:
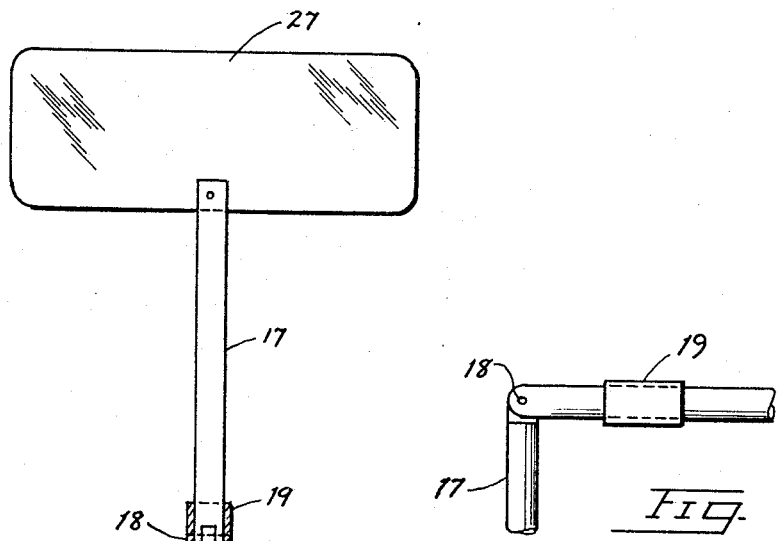
FIGURE 6 is a detail of a similar hinged joint on the manually operated device.
Figure 7:
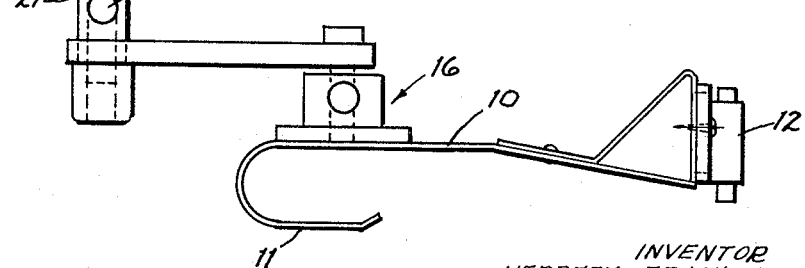
FIGURE 7 shows an elevational view of the manually operated device.

Referring more in detail to the drawing in which similar reference characters designate corresponding parts throughout the several views, it will be seen the invention consists of a base 10, and a clamp 11 adapted to be secured to the dashboard of an automobile. It will be noted that in both, the foot controlled, and the manually controlled device the bases are identical with the exception that the manually controlled device is provided with a magnet 12 which permits the device to be set at any position on a metallic dash.

In the case of the foot controlled device an auxiliary base 13 is pivotally secured to the first mentioned base and is held in predetermined position by means of a spring loaded plunger 14 which registers within one of two apertures 15 to retain the device in the preset position. As illustrated in FIGURE 1 of the drawing the device is for use on a two lane highway, but when driving on a four lane highway, it becomes necessary to cover a wider portion of the road, hence the auxiliary base is rotated until the plunger 14 registers within the aperture 15. On the auxiliary base is secured a fixture 16 on which the plunger 14 is positioned and on which is also adjustably mounted a post 17 which is provided with a hinged joint 18 which is normally covered by a sleeve 19 when the device is in operation, to prevent same from falling against the dash. The post is adjustable up and down by releasing the screw 20.

To the fixture is secured a rotating bearing 21 which is actuated by means of a push wire 22. One extremity of said wire 22 is fastened to a bracket 23, which in turn is secured to said rotating bearing. The outer extremity of the push wire is secured to a foot operated plunger 24 which is provided with a flange 25 for fastening the plunger to the floorboard of an automobile in the proximity of the dimmer switch. The said wire 22 is protected by means of a metallic shield 26.

At the upper extremity of the post 17, the invention provides a rectangular piece of transparent coloured plastic material 27 which has the property of eliminating the glare from the lights of oncoming automobile during night driving.

In operation, the device is set directly in the line of vision of the operator of a vehicle. When driving on a two lane highway the device is preset as illustrated in FIGURE 1 of the drawing.

When an oncoming car approaches the plunger 24 is depressed, causing the post 17 to rotate clockwise to approximately thirty degrees from its original position, as shown in dotted line in FIGURE 1 of the drawing. The glare of the oncoming car headlights are absorbed by the sheet of plastic material and causes a prism effect as illustrated in FIGURE 8; the portion shown in dotted line being lighter in colour than the actual sheet of material. After the vehicle has passed, the plunger is released and the device returns to its original position and does not interfere with the vision of the operator since it presents only a straight line.

When driving on a two lane highway the plunger 14 is released and the device is set so that the plunger registers with the aperture 15 in order to cover a wider strip of road.

On the passenger side of a vehicle a manually controlled deflector is used and is manually set at any desired position to accommodate the passenger. A magnet 12 is provided to secure the deflector at any desired position on a metallic dash.

It is believed the construction and advantages have been fully set forth and that further detailed description is not required.

While the preferred embodiment has been disclosed, it is to be understood that minor modifications may be resorted to without departing from the spirit of the invention and the scope of the claims.

The embodiments of the invention in which an exclusive property or privilege is claimed are defined as follows:

I claim:

A headlight glare deflector comprising a base plate adapted to be secured on top of the dashboard of an automobile, an auxiliary base plate pivotally mounted at one end on said first mentioned base plate to swing in a horizontal plane, a fixture fastened on said auxiliary base plate, a rotating bushing mounted in said fixture, an upright post having its lower end adjustably secured in said bushing, a bracket extending laterally from said bushing, a foot operated plunger mounted on the floorboard of the automobile, a push wire having one end secured to said bracket and its opposite end to said foot operated plunger for rotating said bushing and post when said foot plunger is depressed, a rectangular sheet of coloured plastic material secured midway its length to the upper end of said post in an upright position, and means for securing said auxiliary base plate in different positions.

References Cited
UNITED STATES PATENTS

| | | | |
|---|---|---|---|
| 1,204,186 | 11/1916 | Perry | 296—97 X |
| 1,541,674 | 6/1925 | Wever | 287—99 X |
| 1,880,024 | 9/1932 | Rinker | 296—97 X |
| 2,107,586 | 2/1938 | Sauer | 296—97 |
| 2,117,181 | 5/1938 | Lamar | 296—97 |
| 3,022,109 | 2/1962 | Hauskama | 296—97 |

BENJAMIN HERSH, *Primary Examiner.*

MILTON BUCHLER, *Examiner.*

J. A. PEKAR, *Assistant Examiner.*